US010967278B1

(12) United States Patent
Goodwin

(10) Patent No.: US 10,967,278 B1
(45) Date of Patent: Apr. 6, 2021

(54) SYSTEM AND METHOD OF LEVERAGING ANONYMITY OF COMPUTING DEVICES TO FACILITATE TRUTHFULNESS

(71) Applicant: Kieran Goodwin, New York, NY (US)

(72) Inventor: Kieran Goodwin, New York, NY (US)

( * ) Notice: Subject to any disclaimer, the term of this patent is extended or adjusted under 35 U.S.C. 154(b) by 0 days.

(21) Appl. No.: 16/590,689

(22) Filed: Oct. 2, 2019

(51) Int. Cl.
| *A63F 13/00* | (2014.01) |
| *A63F 13/80* | (2014.01) |
| *G06F 16/332* | (2019.01) |
| *A63F 13/30* | (2014.01) |
| *A63F 13/79* | (2014.01) |

(52) U.S. Cl.
CPC .............. *A63F 13/80* (2014.09); *A63F 13/30* (2014.09); *A63F 13/79* (2014.09); *G06F 16/3329* (2019.01); *A63F 2300/40* (2013.01); *A63F 2300/5546* (2013.01); *A63F 2300/8064* (2013.01)

(58) Field of Classification Search
None
See application file for complete search history.

(56) References Cited

U.S. PATENT DOCUMENTS

| 6,684,248 | B1* | 1/2004 | Janacek | H04L 63/12 709/217 |
| 8,401,883 | B2* | 3/2013 | Villarreal | G06Q 30/0282 705/7.11 |
| 8,955,058 | B2* | 2/2015 | Castro | H04L 63/08 726/4 |
| 9,485,237 | B1* | 11/2016 | Johansson | H04L 63/08 |
| 2002/0103737 | A1* | 8/2002 | Briere | G06Q 40/06 705/36 R |
| 2007/0107051 | A1* | 5/2007 | Carter | G06F 21/6218 726/21 |
| 2008/0005037 | A1* | 1/2008 | Hammad | G06Q 20/40 705/67 |
| 2009/0047928 | A1* | 2/2009 | Utsch | G06Q 20/10 455/410 |
| 2009/0137257 | A1* | 5/2009 | Barber | H04L 12/1831 455/466 |
| 2009/0178120 | A1* | 7/2009 | Royyuru | G06Q 20/4014 726/4 |
| 2014/0057240 | A1* | 2/2014 | Colby | G09B 7/02 434/350 |

(Continued)

*Primary Examiner* — Paul A D'Agostino
(74) *Attorney, Agent, or Firm* — Buchanan Ingersoll & Rooney PC

(57) ABSTRACT

The present disclosure provides a description of systems and methods for providing anonymity to users of computing devices engaged in communication to facilitate truthfulness by the users. A first mobile computing device may establish, with a plurality of other mobile computing devices, a game between a first user of the first mobile computing device and a plurality of other users respectively of the plurality of other mobile computing devices. The first mobile computing device may transmit a first original question and preset answer options for display. The first mobile computing device may determine a first follow-up question to the first original question, a correct answer to the first follow-up question, and one or more incorrect answers to the first follow-up question based on the answer to the first original question from the first user and the plurality of answers to the first original question from the plurality of other users.

21 Claims, 13 Drawing Sheets

(56) References Cited

U.S. PATENT DOCUMENTS

| | | | |
|---|---|---|---|
| 2014/0123256 A1* | 5/2014 | Curren | G06F 21/31 |
| | | | 726/7 |
| 2014/0148930 A1* | 5/2014 | Goodwin | G09B 5/00 |
| | | | 700/92 |
| 2014/0164269 A1* | 6/2014 | Salonen | G06Q 10/02 |
| | | | 705/318 |
| 2014/0259129 A1* | 9/2014 | Copsey | G06F 21/40 |
| | | | 726/5 |
| 2015/0026027 A1* | 1/2015 | Priess | G06Q 20/4016 |
| | | | 705/35 |
| 2015/0205957 A1* | 7/2015 | Turgeman | H04L 63/102 |
| | | | 726/23 |
| 2016/0036807 A1* | 2/2016 | Knauss | G06F 21/42 |
| | | | 726/7 |
| 2017/0243439 A1* | 8/2017 | Moodie | G07F 17/3237 |
| 2017/0250968 A1* | 8/2017 | Licht | H04L 9/3271 |
| 2018/0047025 A1* | 2/2018 | Anderson | G06Q 20/388 |
| 2018/0052981 A1* | 2/2018 | Nygate | G06F 16/2455 |
| 2018/0115899 A1* | 4/2018 | Kedem | G06F 21/554 |
| 2018/0160309 A1* | 6/2018 | Turgeman | G06F 21/554 |
| 2019/0184285 A1* | 6/2019 | Schrager | A63F 13/95 |
| 2019/0188374 A1* | 6/2019 | Arunkumar | G06F 21/305 |
| 2019/0281048 A1* | 9/2019 | Dong | H04L 63/0853 |
| 2020/0043026 A1* | 2/2020 | Cruz-Rivera | G06Q 30/02 |
| 2020/0053074 A1* | 2/2020 | Lum | H04W 12/02 |
| 2020/0169543 A1* | 5/2020 | Vaughn | H04L 63/08 |
| 2020/0234310 A1* | 7/2020 | Daley | H04L 63/08 |

* cited by examiner

SYSTEM AND METHOD OF LEVERAGING ANONYMITY OF COMPUTING DEVICES TO FACILITATE TRUTHFULNESS

FIELD

The present disclosure relates to leveraging the anonymous nature of computing devices to facilitate truthfulness by users. Specifically, the present disclosure relates to systems and methods of permitting users to enter information into computing devices, which is then shared with other uses in an anonymous manner.

BACKGROUND

During parties, family events, and other social gatherings, people often participate in games as a form of entertainment. Such games can range from card games to corn hole. One category of games is so called truth games such as "truth or dare," "never have I ever," and the like. One fundamental flaw of truth games is that they rely on players telling the truth when participating. However, a player can easily lie when participating in the truth game. This is exacerbated by the fact that often such truth games relate to uncommon or questionable behavior or choices the player has made in the past. Because the player may be uncomfortable or embarrassed by his or her truthful response, the player is often motivated to lie in his or her responses.

Thus, there is a need for a technical solution that is rooted in computer technology to provide anonymity to players of truth games in order to promote truthfulness by the players.

SUMMARY

The present disclosure provides a description of systems and methods for providing anonymity to users of computing devices engaged in communication to facilitate truthfulness by the users.

A method may utilize a first mobile computing device, which may establish, with a plurality of other mobile computing devices, a game between a first user of the first mobile computing device and a plurality of other users respectively of the plurality of other mobile computing devices. The first mobile computing device may transmit, to the plurality of other mobile computing devices, a first original question and preset answer options for display. The first mobile computing device may receive an answer to the first original question from the first user. The first mobile computing device may receive, from the plurality of other mobile computing devices, a plurality of answers to the first original question from the plurality of other users. The first mobile computing device may maintain anonymity of an association of the plurality of other users to the plurality of answers to the first original question from the plurality of other users. The first mobile computing device may determine a first follow-up question to the first original question, a correct answer to the first follow-up question, and one or more incorrect answers to the first follow-up question based on the answer to the first original question from the first user and the plurality of answers to the first original question from the plurality of other users. The first mobile computing device may transmit, to the plurality of other mobile computing devices for display, the first follow-up question to the first original question, the correct answer to the first follow-up question, and the one or more incorrect answers to the first follow-up question. The first mobile computing device may display the first follow-up question to the first original question, the correct answer to the first follow-up question, and the one or more incorrect answers to the first follow-up question. The first mobile computing device may receive an answer to the first follow-up question from the first user. The first mobile computing device may receive, from the plurality of other mobile computing devices, a plurality of answers to the first follow-up question from the plurality of other users. The first mobile computing device may determine whether at least one user answered the first follow-up question correctly. The first mobile computing device may transmit, to the plurality of other mobile computing devices, results of the determination of whether at least one user answered the first follow-up question correctly.

A first mobile computing device may include a processor and a memory storing instructions that, when executed by the processor, causes the first mobile computing device to perform the above-described method.

A system may include a first mobile computing device and a plurality of other mobile computing devices. The first mobile computing device may be configured to perform the above-described method.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIG. 1 depicts a block diagram of a high-level system architecture for leveraging anonymity provided to users by computing devices to promote truthfulness in communications in accordance with illustrative embodiments.

FIGS. 2A-F depict a flow diagram illustrating a process for leveraging anonymity provided to users by computing devices to promote truthfulness in communications in accordance with illustrative embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Aspects of the technical solution include systems, apparatuses, and methods for facilitating truthfulness by users in a group social environment. The technical solution is rooted in computer technology in that specially programmed computing devices are used to ensure that a user maintains anonymity when providing an answer to the group social environment.

In one illustrative use case, the group social environment may be a group of family and/or friends participating in truth-based trivia party games—that is, trivia games where players are expected to provide truthful answers to questions or responses to statements posed to the player (or group of players). Such games are intended to provide entertainment, in part, as a result of the players learning about one another due to the expected truthfulness of the answers. However, in some cases, a player may become motivated to lie in his or her answer or response to a statement in order to avoid disclosing embarrassing or shocking information. In order to avoid such issues, the trivia party games may be embodied in a mobile software application that is installed on each player's personal mobile computing device (e.g., tablet, smartphone, smartwatch, etc.). The players may provide answers to questions or responses to statements posed to the group of players through the mobile software application. Response options to a question or statement may be preset (e.g., true or false, yes or no, etc.). The mobile software applications installed the various player mobile computing devices may provide the players' answers or responses to each other player's mobile computing device in the group in such a manner so as to maintain anonymity of the player providing the answer. The mobile software application may analyze the anonymous answers provided by the players and, based thereon, provide one or more follow-up questions to the group of users where the answers to the follow-up questions are determined based on the answers to the previous question. The mobile software application may determine whether to allocate points to one or more players and how many points to allocate based on an analysis of the collection of player answers to the one or more follow-up questions. A winner of a game may be determined based on the player who obtains the most points.

Figure 1:
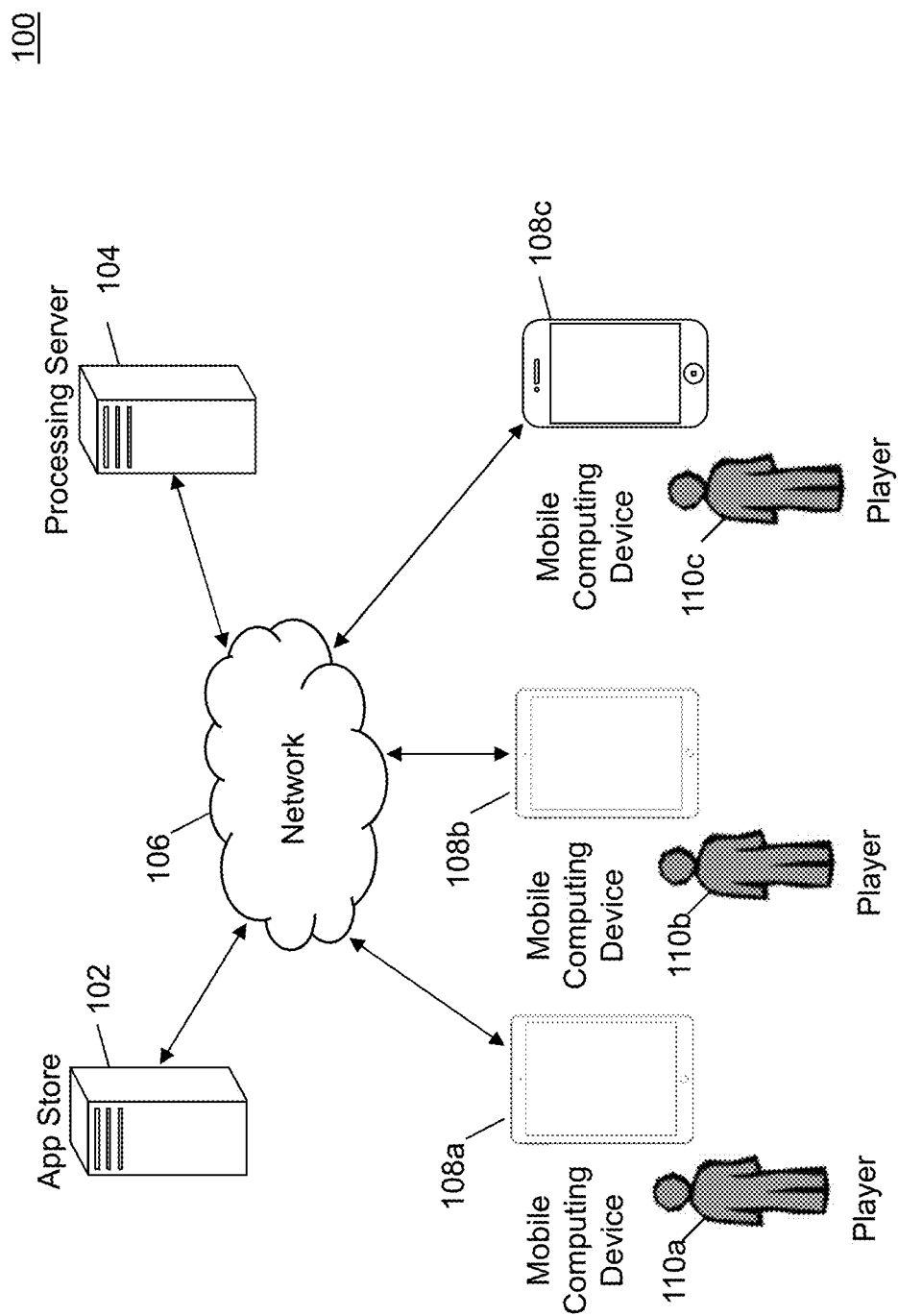

FIG. 1 depicts a block diagram of a high-level system architecture for leveraging anonymity provided to users by computing devices to promote truthfulness in communications in accordance with illustrative embodiments. The architecture may be embodied in a system 100, which includes a software application store 102 (hereinafter "app store"), a processing server 104, one or more networks 106, and a group of mobile computing devices 108 that are respectively operated by different players 110.

The app store 102 may be responsible for providing a mobile software application (hereinafter, "mobile app") that, once installed on a mobile computing devices, causes the mobile computing device to become specially programmed to perform various aspects discussed herein. The mobile app may be configured to provide one or more trivia party games as discussed herein. The app store 102 may also be responsible for managing in app purchases, provide updates to the mobile app, and manage credentials of the players. The app store 102 may be one or more servers or other computing devices as described in FIG. 15 and may communicate with one or more of the processing server 104 or mobile computing devices 108 via one or more networks 106 (e.g., intranet, Internet, local area network, wide area network, etc.). The one or more networks 106 may be wired or wireless, or a combination thereof. In some examples, the app store 102 may be Apple's app store, Google's play store, or the like.

The processing server 104 may be responsible for managing games played on the mobile app between players 110. In some instance, the processing server 104 may act as a proxy to relay messages between the mobile computing devices 108. In some instances, the processing server 104 may perform one or more determinations and/or calculations and provide such information to the mobile computing devices 108. As an example, the mobile app installed on the mobile computing devices 108 may provide player answers or responses to the processing server 104. The processing server 104 may then either forward the answers or responses to the other players' mobile computing devices 108 or provide an aggregated summary of the answers or responses to each player's mobile computing device 108. The processing server 104 may provide this information in such a manner so as to maintain anonymity of the player providing the answer or response. The processing server 104 may be one or more servers or other computing devices as described in FIG. 15 and may communicate with one or more of the app store 102 or mobile computing devices 108 via one or more networks 106 (e.g., intranet, Internet, local area network, wide area network, etc.). The one or more networks 106 may be wired or wireless, or a combination thereof. The processing server 104 may include a database to manage multiple different games being played by different groups of players.

Each player 110 may have a mobile computing device 108, which may be responsible for executing the mobile app and providing a human-machine interface for the player 110 such that the mobile computing device 108 performs various features described herein. The mobile app may also be responsible for maintaining anonymity of players in connection with answers or responses provided by the players. For instance, the mobile app may prevent (e.g., block) display of information identifying player and/or a player's device in connection with a provided answer or response. The mobile app may permit identifying information of other players or the players' devices in connection with points obtained by these other players in the game. Each mobile computing device may be, for example, a tablet computer, a smartphone, a smartwatch, a laptop computer, or other computing devices as described in FIG. 15 and may communicate with one or more of the app store 102, processing server 104, and other mobile computing devices 108 via one or more networks 106 (e.g., intranet, Internet, local area network, wide area network, etc.). The one or more networks 106 may be wired or wireless, or a combination thereof. The mobile computing device 108 may include a camera by which QR codes may be scanned. Functions described as being performed by the mobile computing device 108 after installation of the mobile app may be caused by the mobile computing device 108 executing the mobile app.

Figure 2A:
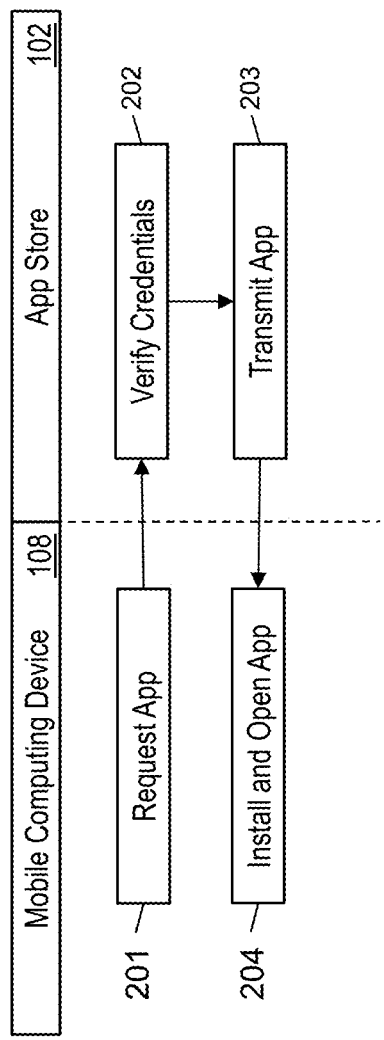

FIG. 2A depicts a flow diagram illustrating a process for obtaining the mobile app in accordance with illustrative embodiments. Each mobile computing device 108 (e.g., mobile computing devices 108a-c) may, at step 201, request the mobile app from the app store 102. For instance, access to the app store 102 may be provided via an app store mobile software application already installed in the mobile computing device 108. The app store mobile software application may permit the user to lookup the mobile app for download. Once the player 110 selects the mobile app, the app store mobile software application may also request the player to enter the player's credential information (e.g., password). The app store mobile software application may then transmit a message from the mobile computing device 108 to the app store 102. The message may include a mobile computing device identifier, an identifier of the mobile app being requested for download, and the player's credential information. In some cases, rather than using the app store mobile software application, the player may navigate using a web browser installed on the mobile computing device 108 to a web-based portal provided by the app store 102 to request the mobile app. At step 202, the app store 102 may verify the credentials provided in the message. For instance, the app store 102 may compare the mobile computing device identifier and password to a stored mobile computing device identifier and password for the player. If the player's credentials are valid (e.g., there is a match), the app store 102 may, at step 203, transmit the mobile app to the mobile computing device 108, which, in turn, installs and opens the mobile app at step 204. Otherwise, if the player's credentials are invalid (e.g., there is not a match), the app store 102 may deny download of the mobile app.

Figure 2B:
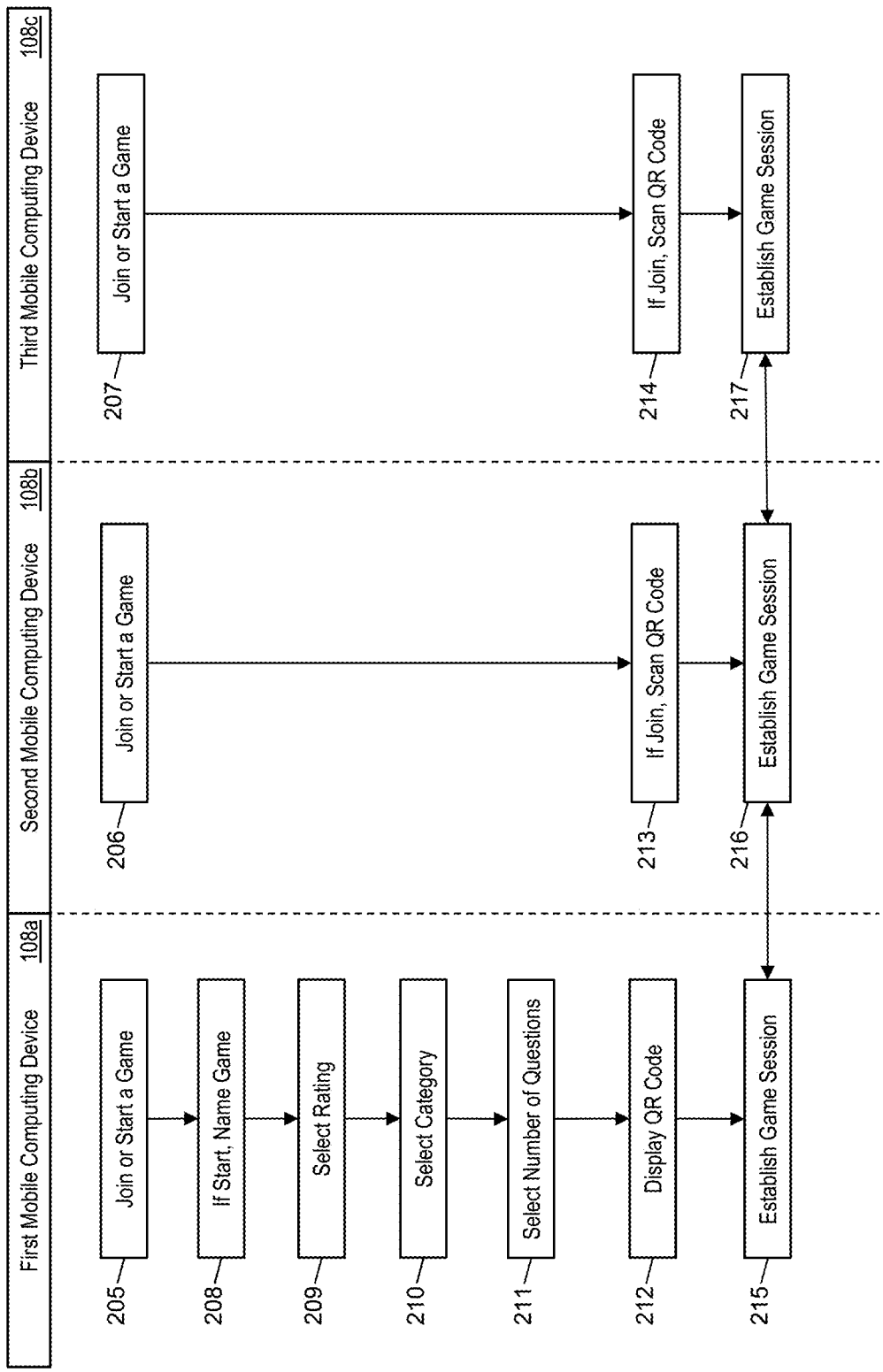
Figure 4:
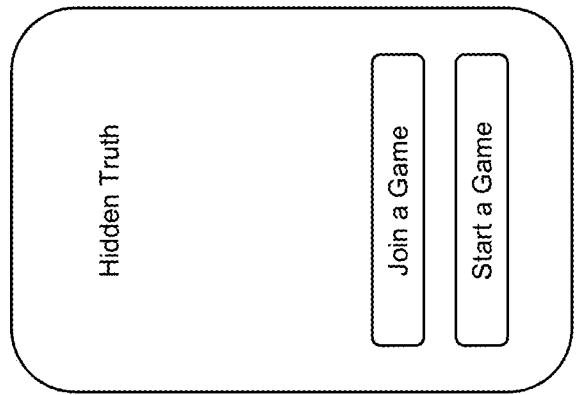

FIG. 2B depicts a flow diagram illustrating a process for establishing a game session in the mobile app in accordance with illustrative embodiments. Once the mobile app is opened on the mobile computing devices 108, the mobile computing devices 108 may execute one or more instructions of the mobile app. At steps 205-207, the mobile apps may cause mobile computing devices 108*a-c* to display a user interface in which the players 110 are asked whether the player wishes to join a game or start a game. An example of such a user interface is depicted in FIG. 4, which include two preset selectable buttons (e.g., a "Join a Game" option and a "Start a Game" option). Each player 110 selects one of the two options. In the example depicted in FIG. 2B, the player 110*a* selects the "Start a Game" option while the other two players 110*b-c* select the "Join a Game" option. In some cases, once the player selects one of the two options, the respective mobile app may prompt the player to enter the player's name for use in the mobile app.

Figure 5:
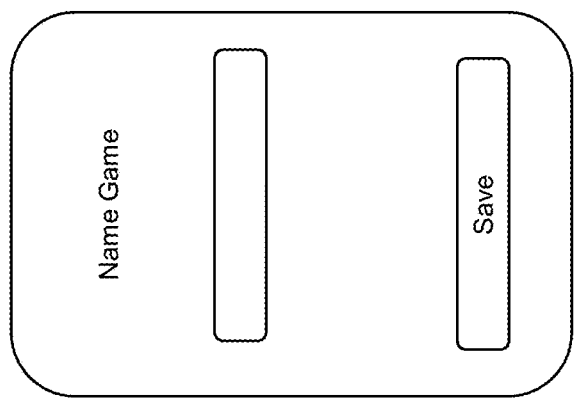

In this example, because player 110*a* selected the "Start a Game" option, the player's mobile computing device 108*a* performs steps 208-212. As a result of starting the game, the player 110*a* may be considered the host of the game. At step 208, the player 110*a* may, via a user interface displayed by the first mobile computing device 108*a*, name the game. A user interface for entering the name of the game is depicted in FIG. 5, which includes a field for the player 110*a* to enter the name of the game and a save button to save the name of the game to memory accessible by the mobile app.

Figure 6:
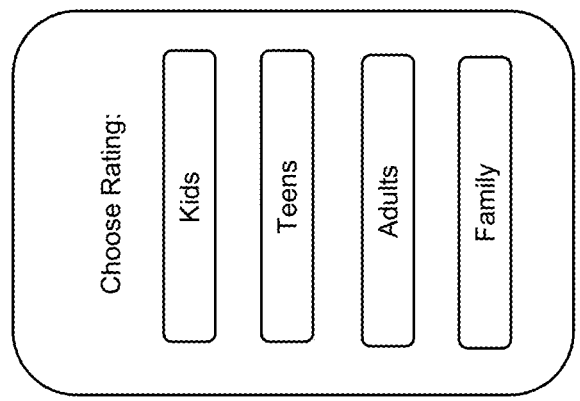
FIGS. 4-14 depict various user interfaces in accordance with illustrative embodiments.

At step 209, the player 110*a* may, via a user interface displayed by the mobile computing device 108*a*, select a rating for the game. An example of such a user interface is depicted in FIG. 6. Each rating may be specific to a different intended group of players. For example, as shown in FIG. 6, ratings include a kids rating, a teens rating, an adults rating, and a family rating. The mobile app may include a repository of trivia party questions. Each of the questions has an intended audience for which the question is appropriate. To this end, each question in the repository is tagged with a rating for its intended audience. As an example, a question having a kids rating is appropriate for kids while a question having an adults rating is appropriate for adults but not for kids, teens, and family. As another example, a question specific to familial relationships may be appropriate if the players are family members but not for kids, teens or adults. The mobile computing device 108*a* may, for the game, select questions having the selected rating tag but may not select questions having ratings tags that were not selected by the player 110*a*.

Figure 7:
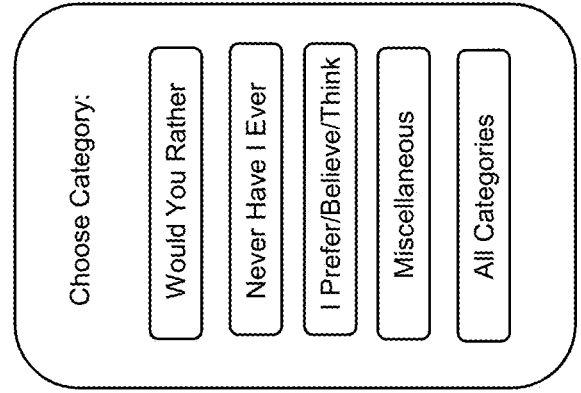

At step 210, the player 110*a* may, via a user interface provided by the first mobile computing device 108*a*, select a category. An example of such a user interface is depicted in FIG. 7. Each category may have different one or more specific structures of questions or statements. To this end, each question in the repository is tagged with a specific category. Categories include "would you rather," "never have I ever," "I prefer/believe/think," "miscellaneous," or the like. The mobile computing device 108*a* may, for the game, select questions having the selected category tag but may not select questions having category tags that were not selected by the player 110*a*. As shown in FIG. 7, the user interface also presents the player 110*a* with the option to select "all categories," which allows questions having any category tag to be used in the game.

Figure 8:
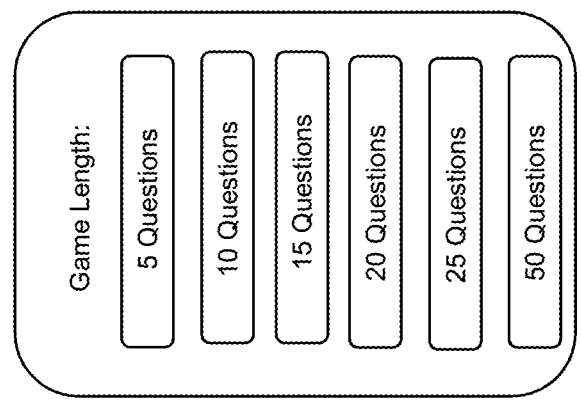

At step 211, the player 110*a* may, via a user interface provided by the first mobile computing device 108*a*, select a number of questions for the game length. An example of such a user interface is depicted in FIG. 8. In this example, the user interface presents six preset options including game lengths of 5, 10, 15, 20, 25, or 50 questions. However, the game length may be any player-specified number of questions.

Figure 9:
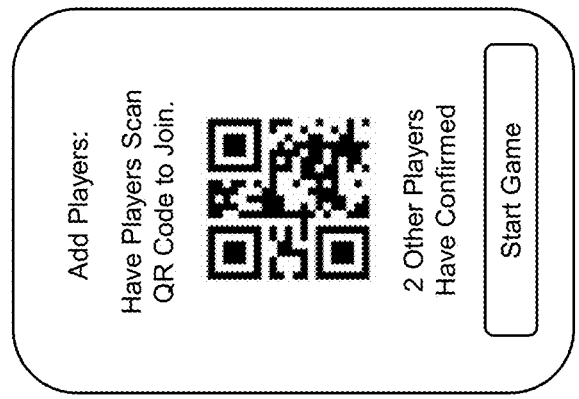
Figure 10:
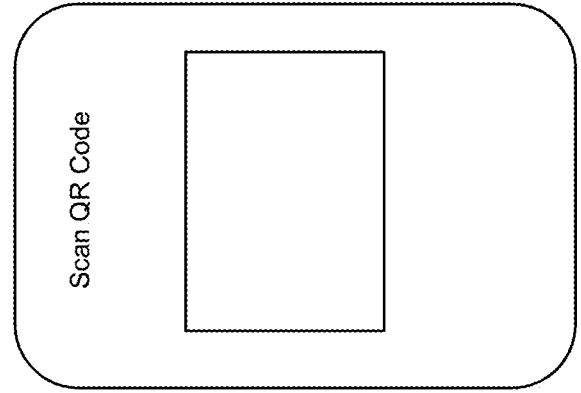

At step 212, the first mobile computing device 108*a* may generate a quick response (QR) code and display a user interface that includes the QR code. An example of such a user interface is depicted in FIG. 9. The QR code may be a machine-readable label that includes network address (e.g., IP address, MAC address) of the first mobile computing device 108*a*, and/or an identifier of the mobile computing device. In some instances, the QR code may also include information about the game (e.g., player name, game name, selected rating, selected category, game length, etc.). At steps 213 and 214, the displayed QR code is scanned using the camera of the other mobile computing devices 108*b-c* in order to facilitate establishing a game session between the mobile computing devices 108*a-c*. An example of a user interface to scan the QR code is depicted in FIG. 10, where the box represents window view of the camera. As a result of the scanning, the second and third mobile computing device 108*b-c* may have the network address of the first mobile computing device.

In some instances, at step 212, the first mobile computing device 108*a* may display a mnemonic code instead of (or in addition to) the QR code. The other players 110*b-c* may enter the mnemonic code on their mobile computing devices at steps 213 and 214. Each of the mobile apps installed on the mobile computing devices 108*a-c* may transmit a message including the mnemonic code and a network address (e.g., IP address, MAC address, etc.) of the mobile computing device sending the message to a preset network address for the processing server 104, which may be specified by the mobile app. The processing server 104 may relay messages including the mnemonic code received from mobile computing devices to other mobile computing devices that have sent messages having the same mnemonic code. Thus, each of the mobile computing devices 108 may have each other's network address to facilitate communications there between.

At steps 215-217, the mobile computing devices 108*a-c* may establish a game session. For instance, to the extent not already exchanged, network addresses of the mobile computing devices 108*a-c* may be exchanged with one another to facilitate communications between them. Additionally, if not already exchanged, information about the game (e.g., player name, game name, selected rating, selected category, game length, total number of players, etc.) may be exchanged between the mobile computing devices. Because the player 110*a* is the host of the game as a result of starting the game, the first mobile computing device 108*a* may be considered the host computing device and may be responsible for managing the game. As such, the first mobile computing device 108*a* may determine an ordered set of questions based on the selected rating and category and transmit the ordered set to the other mobile computing devices 108*b-c*. In some instances, rather than transmit the questions themselves, the first mobile computing device 108*a* may transmit identifiers of the questions for retrieval by the other mobile computing devices 108*b-c* from their memory associated with the mobile app. In some instances, rather than transmit the entire ordered set, the first mobile computing device may simply transmit the first question or identifier of the first question to the other mobile computing devices. Additionally, the first mobile computing device 108*a* may transmit initialization values for the game (e.g., 0 points for each player, each player's name, etc.). In some instances, the processing server 104, rather than the first mobile computing device, may act as the host for the game and transmit the above-listed gaming information to each of the mobile computing devices 108*a-c*.

Figure 11:
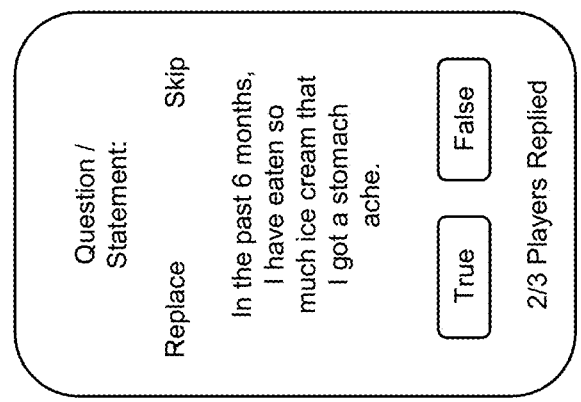

FIGS. 2C-F depict a flow diagram illustrating a process for managing a game leveraging anonymity provided to users by computing devices to promote truthfulness in communications in accordance with illustrative embodiments. At steps 218-223, the same preset question (also referred to herein as an "original question") and same preset answer options may be presented, via user interfaces on mobile computing devices 108*a-c*, to players 110*a-c*. An example of such a user interface for the first mobile computing device is depicted in FIG. 11. As shown in FIG. 11, in some cases, the preset questions may be a preset statement. In the example depicted in FIG. 11, the question/statement is "in the past 6 months, I have eaten so much ice cream that I got a stomach ache." While the preset answer options include "True" and "False," other preset answer options, such as, for example, "yes" and "no" may be presented. A similar user interface may be presented by the second and third mobile computing devices 108*b-c*. However, their user interfaces might not include an option to replace a question, skip a question, or an indication of how many players replied as will be explained herein.

At step 224, the first mobile computing device 108*a* may receive a response from player 110*a*, increment a counter, update the display, and determine if the counter matches the preset number of players. For instance, the player 110*a* may select one of "True" or "False." The answer may be stored in gaming table for tracking aspects of the game and which is generated and/or updated by the mobile app. Once the player 110*a* selects a response option, the first mobile computing device 108*a* may increment a counter of the mobile app. The counter may represent the number of players that have responded to the question or statement. The counter may be stored in program memory allocated to the mobile app within the first mobile computing device 108. The first mobile computing device 108*a* may update the user interface to indicate the number of players that have responded out of the total number of players as shown in FIG. 11. The first mobile computing device 108*a* may determine whether all players have responded to the question or statement by comparing whether the counter matches the total number of players in the game. If so, the process may continue to step 229 depicted in FIG. 2D. Otherwise, if not all players have responded (e.g., the counter does not match the total number of players in the game), the first mobile computing device 108*a* may wait until each of the other players have answered the question or statement. In some cases, the first mobile computing device 108*a* may wait a preset time period and may continue to step 229 as though the counter matches the preset number of players.

At step 225, the second mobile computing device 108*b* may receive an answer (e.g., True or False to the presented question) and transmit the answer to the first mobile computing device 108*a*. The second mobile computing device 108*b* may also transmit information identifying the player (e.g., the player's name) and/or an identifier (e.g., MAC address) of the second mobile computing device 108*b*.

At step 226, the first mobile computing device 108*a* may store the information received from the second mobile computing device 108*b* (e.g., answer, player name, device identifier, etc.) in the gaming table. Anonymity of the second player's 110*b* response is maintained by the first mobile computing device 108*a*. For instance, the first mobile computing device 108*a* is configured to prevent (e.g., block) access to information associating the player 110*b* to the player 110*b*'s answer. The first mobile computing device 108*a* is also configured to prevent display of such information. Once the player's 110*b* answer is received, the first mobile computing device 108*a* may increment the counter representing the number of players that have responded to the question or statement. The first mobile computing device 108*a* may update the user interface to indicate the number of players that have responded out of the total number of players as shown in FIG. 11. The first mobile computing device 108*a* may determine whether all players have responded to the question or statement by comparing whether the counter matches the total number of players in the game. If so, the process may continue to step 229. Otherwise, if not all players have responded (e.g., the counter does not match the total number of players in the game), the first mobile computing device 108*a* may wait until each of the other players have answered the question or statement. In some cases, the first mobile computing device 108*a* may wait a preset time period and may continue to step 229 as though the counter matches the preset number of players.

At step 227, the third mobile computing device 108*c* may receive an answer (e.g., True or False to the presented question) and transmit the answer to the first mobile computing device 108*a*. The third mobile computing device 108*c* may also transmit information identifying the player (e.g., the player's name) and/or an identifier (e.g., MAC address) of the third mobile computing device 108*c*.

At step 228, the first mobile computing device 108*a* may store the information received from the third mobile computing device 108*c* (e.g., answer, player name, device identifier, etc.) in the gaming table. Anonymity of the third player's 110*c* response is maintained by the first mobile computing device 108*a*. For instance, the first mobile computing device 108*a* is configured to prevent (e.g., block) access to information associating the player 110*c* to the player 110*c*'s answer. The first mobile computing device 108*a* is also configured to prevent display of such information. Once the player's 110*c* answer is received, the first mobile computing device 108*a* may increment the counter representing the number of players that have responded to the question or statement. The first mobile computing device 108*a* may update the user interface to indicate the number of players that have responded out of the total number of players as shown in FIG. 11. The first mobile computing device 108*a* may determine whether all players have responded to the question or statement by comparing whether the counter matches the total number of players in the game. If so, the process may continue to step 229. Otherwise, if not all players have responded (e.g., the counter does not match the total number of players in the game), the first mobile computing device 108*a* may wait until each of the other players have answered the question or statement. In some cases, the first mobile computing device 108*a* may wait a preset time period and may continue to step 229 as though the counter matches the preset number of players.

While steps 224-228 have been presented in a particular order, other orders are possible. As an example, the second player 110*b* may provide an answer prior to the first player 110*a*. In such an example, steps 225 and 226 may be performed prior to step 224. As another example, the third player 110*c* may provide an answer prior to the second player 110*b*. In such an example, steps 227 and 228 may be performed prior to steps 225 and 226. As yet another example, the third player 110*c* may provide an answer prior to the first player 110*a*. In such an example, steps 227 and 228 may be performed prior to step 224.

Figure 2C:
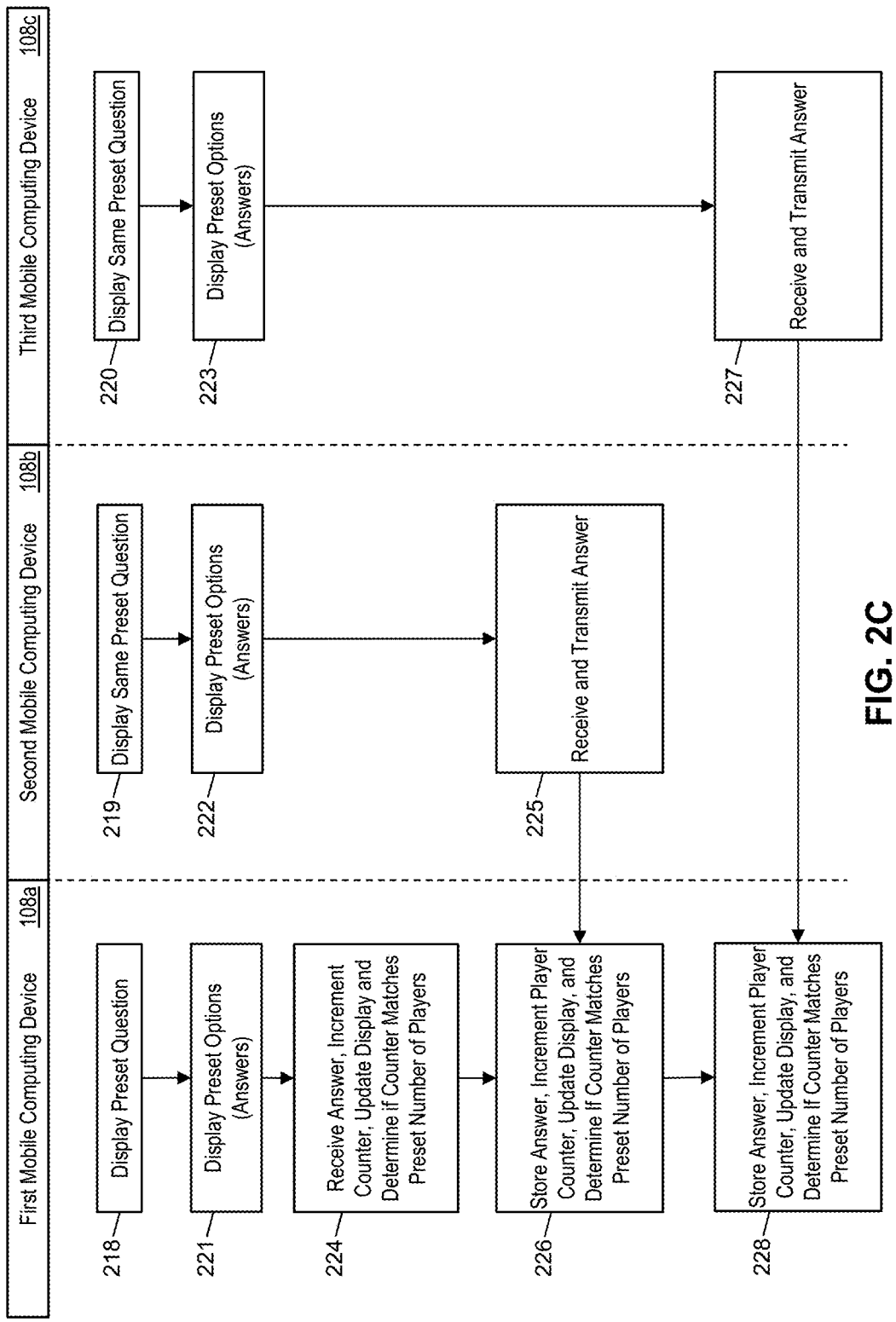
Figure 2D:
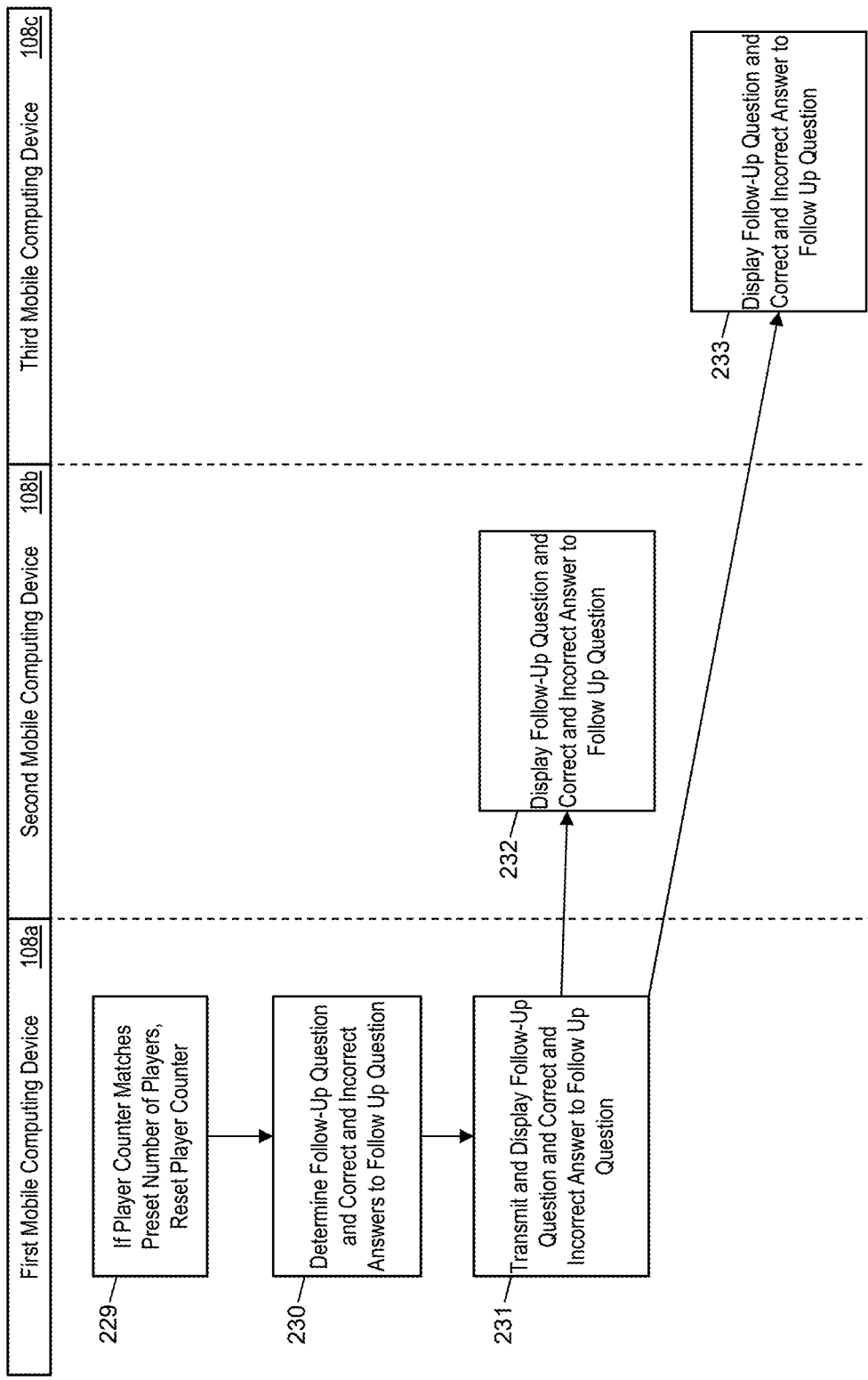

In the example illustrated in FIG. 2C, once the first mobile computing device 108*a* receives the answer of the third player 110*c* and updates the counter, the first mobile computing device 108*a* determines that all players have responded since the counter matches the preset number of players in the game and proceeds to step 229. At step 229, the first mobile computing device 108*a* resets the counter to zero.

At step 230, the first mobile computing device 108*a* may determine, based on the answers to the question received in steps 224-228, a follow-up question, a correct answer to the follow-up question, and one or more incorrect answers to the follow up question. The follow-up question may be predetermined but have a dynamic field to update using the original question. As discussed in an example, an original question or statement may be "in the past 6 months, I have eaten so much ice cream that I got a stomach ache." The follow-up question may be predetermined as "Guess How Many Players Selected True for:" and which is followed by a dynamic field to fill in the original question. As a result, the follow-up question may be "Guess How Many Players Selected True for: in the past 6 months, I have eaten so much ice cream that I got a stomach ache." While one example of a predetermined question is discussed above, other predetermined questions with or without dynamic fields may be used.

The first mobile computing device 108*a* may determine the correct answer to the follow-up question based on the answers provided by the players 110*a-c*. For instance, the first mobile computing device 108*a* may determine the number of players 110 that answered true to the original question and this number may be set as the correct answer to the follow-up question. As an example, if two of the three players 110*a-c* answered true to the original question, then the correct answer to the example follow up question is 2.

The first mobile computing device 108*a* may also determine one or more plausible incorrect answers to the follow-up question based on the answers provided by the players 110*a-c*. As discussed above, the first mobile computing device 108*a* may determine the number of players 110 that answered true to the original question. The first mobile computing device 108*a* may generate one or more numbers other than the correct number from the range of plausible numbers (e.g., zero to the total number of players). In this example, there are only 3 players and the correct answer is 2. As a result, the first mobile computing device 108*a* may determine plausible incorrect answers as 0, 1, or 3.

Figure 12:
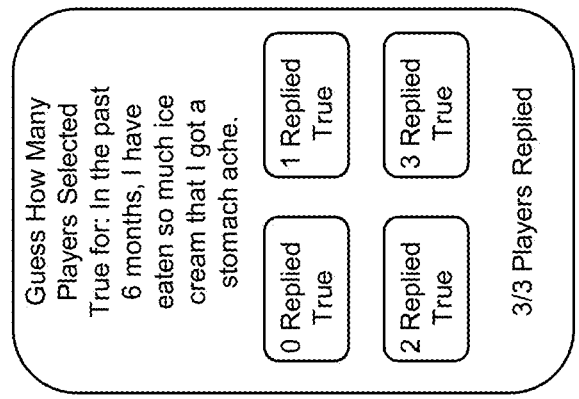

At step 231, the first mobile computing device 108*a* may transmit and display the follow-up question, the correct answer to the follow-up question, and one or more incorrect answers to the follow-up question. For instance, the first mobile computing device 108 may transmit such information in a message to the other mobile computing devices (e.g., mobile computing devices 108*b-c*) participating in the game. At steps 231-233, each of the mobile computing devices 108*a-c* may display, in a user interface, the follow up question, the correct answer and the one or more incorrect answers to the players 110*a-c*. The user interface does not indicate which answer is correct and which answers are incorrect. An example of the user interface for the first mobile computing device is depicted in FIG. 12. A similar user interface may be presented by the second and third mobile computing devices 108*b-c*. However, their user interfaces might not include an indication of how many players replied.

At step 234, the first mobile computing device 108*a* may receive an answer to the follow-question from player 110*a*, increment the counter, update the display, and determine if the counter matches the preset number of players. For instance, the player 110*a* may select one of "0 Replied True," "1 Replied True," "2 Replied True," or "3 Replied True." The answer may be stored in the gaming table for tracking aspects of the game and which is generated and/or updated by the mobile app. Once the player 110*a* selects a response option, the first mobile computing device 108*a* may increment a counter of the mobile app. The first mobile computing device 108*a* may update the user interface to indicate the number of players that have responded out of the total number of players as shown in FIG. 12. The first mobile computing device 108*a* may determine whether all players have responded to the question or statement by comparing whether the counter matches the total number of players in the game. If so, the process may continue to step 239. Otherwise, if not all players have responded (e.g., the counter does not match the total number of players in the game), the first mobile computing device 108*a* may wait until each of the other players have answered the follow-up question. In some cases, the first mobile computing device 108*a* may wait a preset time period and may continue to step 239 as though the counter matches the preset number of players.

At step 235, the second mobile computing device 108*b* may receive an answer to the follow-up question (e.g., one of "0 Replied True," "1 Replied True," "2 Replied True," or "3 Replied True") and transmit the answer to the first mobile computing device 108*a*. The second mobile computing device 108*b* may also transmit information identifying the player (e.g., the player's name) and/or an identifier (e.g., MAC address) of the second mobile computing device 108*b*.

At step 236, the first mobile computing device 108*a* may store the information received from the second mobile computing device 108*b* (e.g., answer, player name, device identifier, etc.) in the gaming table. Once the player's 110*b* answer is received, the first mobile computing device 108*a* may increment the counter representing the number of players that have responded to the follow-up question. The first mobile computing device 108*a* may update the user interface to indicate the number of players that have responded out of the total number of players as shown in FIG. 12. The first mobile computing device 108*a* may determine whether all players have responded to the question or statement by comparing whether the counter matches the total number of players in the game. If so, the process may continue to step 239. Otherwise, if not all players have responded (e.g., the counter does not match the total number of players in the game), the first mobile computing device 108*a* may wait until each of the other players have answered the follow-up question. In some cases, the first mobile computing device 108*a* may wait a preset time period and may continue to step 239 as though the counter matches the preset number of players.

At step 237, the third mobile computing device 108*c* may receive an answer (e.g., one of "0 Replied True," "1 Replied True," "2 Replied True," or "3 Replied True") and transmit the answer to the first mobile computing device 108*a*. The third mobile computing device 108*c* may also transmit information identifying the player (e.g., the player's name) and/or an identifier (e.g., MAC address) of the third mobile computing device 108*c*.

At step 238, the first mobile computing device 108a may store the information received from the third mobile computing device 108c (e.g., answer, player name, device identifier, etc.) in the gaming table. Once the player's 110c answer is received, the first mobile computing device 108a may increment the counter representing the number of players that have responded to the follow-up question. The first mobile computing device 108a may update the user interface to indicate the number of players that have responded out of the total number of players as shown in FIG. 12. The first mobile computing device 108a may determine whether all players have responded to the question or statement by comparing whether the counter matches the total number of players in the game. If so, the process may continue to step 239. Otherwise, if not all players have responded (e.g., the counter does not match the total number of players in the game), the first mobile computing device 108a may wait until each of the other players have answered the follow-up question. In some cases, the first mobile computing device 108a may wait a preset time period and may continue to step 239 as though the counter matches the preset number of players.

While steps 234-238 have been presented in a particular order, other orders are possible. As an example, the second player 110b may provide an answer prior to the first player 110a. In such an example, steps 235 and 236 may be performed prior to step 234. As another example, the third player 110c may provide an answer prior to the second player 110b. In such an example, steps 237 and 238 may be performed prior to steps 235 and 236. As yet another example, the third player 110c may provide an answer prior to the first player 110a. In such an example, steps 237 and 238 may be performed prior to step 234.

Figure 2E:
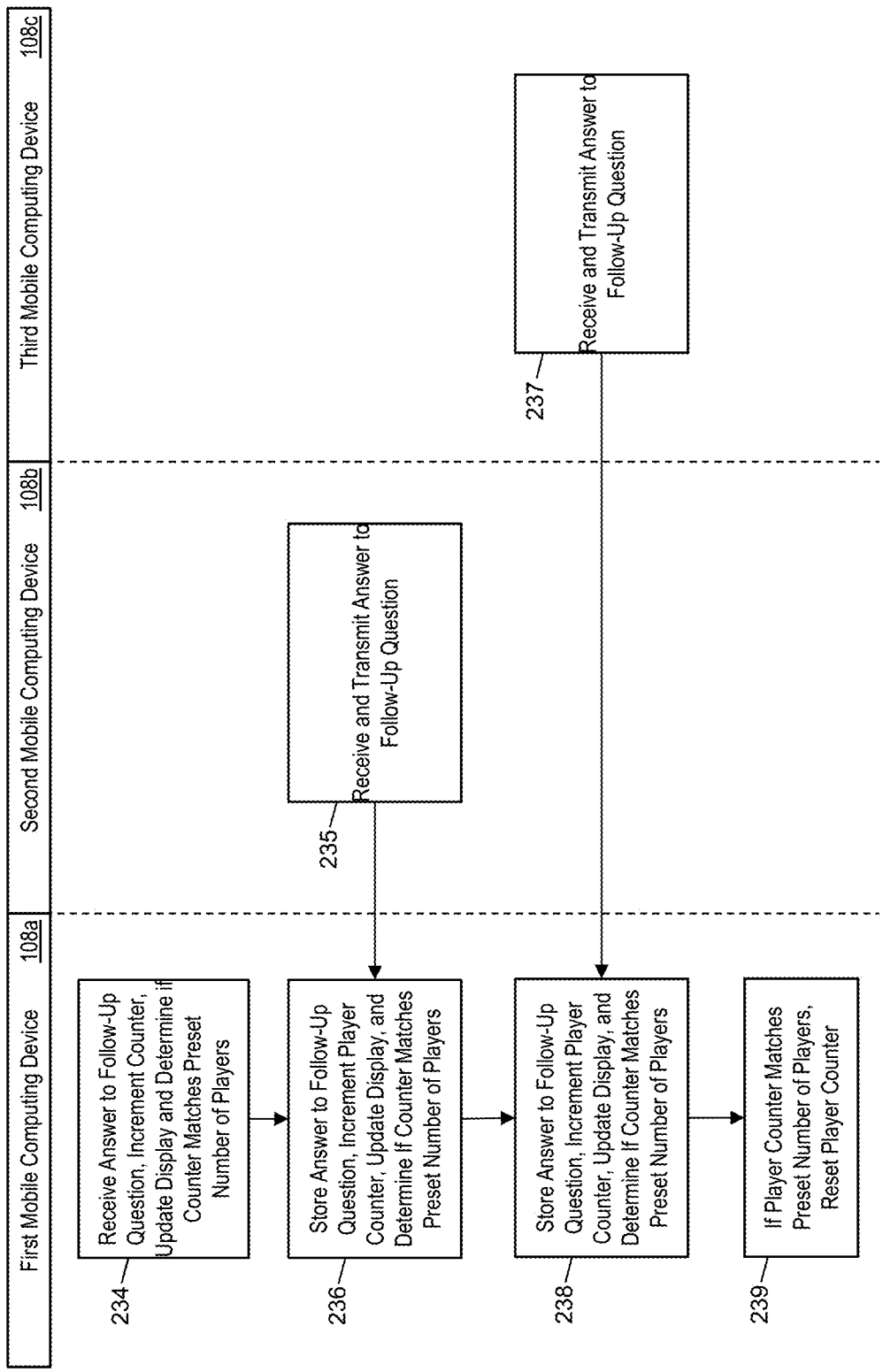
Figure 2F:
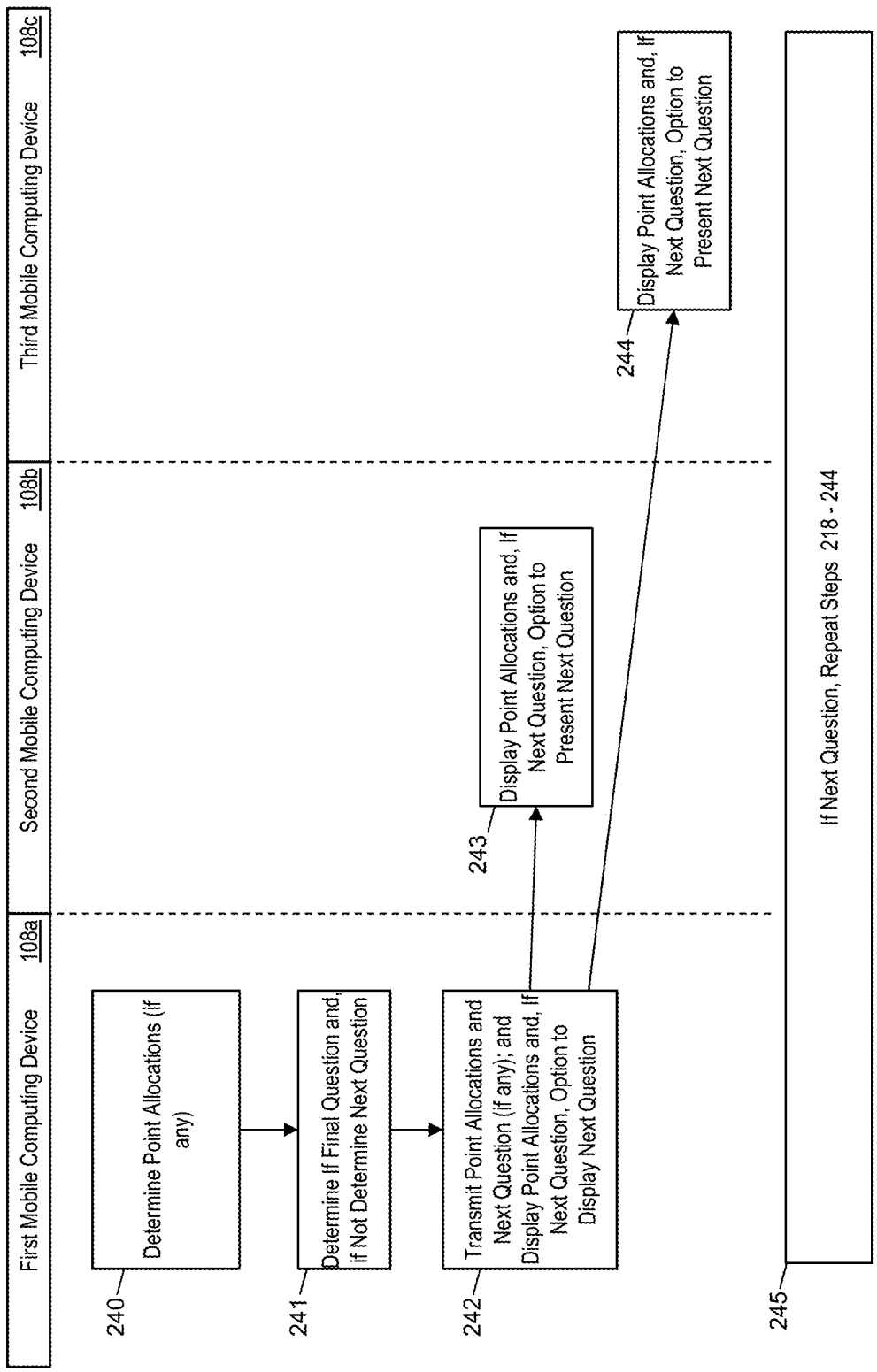

In the example illustrated in FIG. 2E, once the first mobile computing device 108a receives the answer of the third player 110c and updates the counter, the first mobile computing device 108a determines that all players have responded since the counter matches the preset number of players in the game and proceeds to step 239. At step 239, the first mobile computing device 108a resets the counter to zero.

Figure 3:
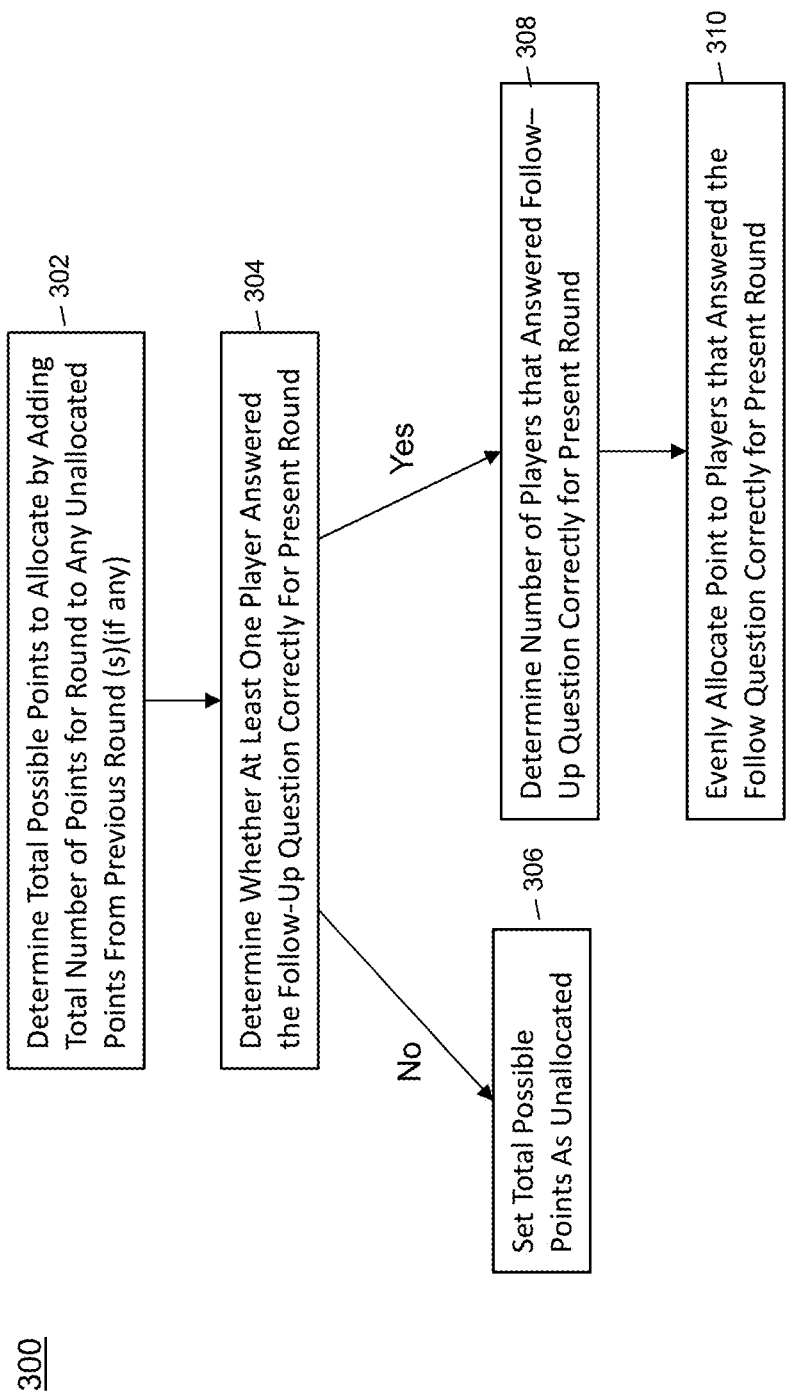
FIG. 3 depicts a flow chart for determining point allocations in accordance with illustrative embodiments.

At step 240, the first mobile computing device 108a may determine point allocations (if any) for each of the players by performing the process depicted in FIG. 3. FIG. 3 depicts a flow chart 300 for determining point allocations in accordance with illustrative embodiments. The steps of FIG. 3 may be performed by the first computing device 108 (and/or the processing server 104). As used herein, each round in the game may include obtaining answers to a question and a follow-up question. A subsequent round may include obtaining answer to a different question and a follow-up question. The number rounds included in the game is based on the game length (e.g., the number of questions selected in step 211 and FIG. 8). The game length does not include follow-up questions. In some instances, each round may include steps 218-244.

At step 302, the first mobile computing device 108 may determine the total possible points to allocate by adding the number of points for the present round to any unallocated points from the previous round(s) (if any). Each round is worth the number of point equal to the number of players. Thus, in the example of FIG. 2, because there are 3 players, the number points for the present round is 3 points. If the present round is the first round, there is not a previous round and, thus, there are not any unallocated points from the previous round. If the present round is not the first round, there may or may not be unallocated points from the previous round. Unallocated from a previous round may be stored by the mobile app in the gaming table, which is stored in memory of the first mobile computing device 108a.

At step 304, the first mobile computing device 108a may determine whether at least one player answered the follow-up question correctly for the present round. If not, the total possible points to allocate (e.g., the number of points for the present round plus any unallocated points from previous round(s)) is set as unallocated and stored in the gaming table for allocation in subsequent rounds at step 306. Thus, in future rounds, these points may be allocated to the players 110. Otherwise, if at least one player answered the follow-up question correctly in the present round, the first mobile computing device 108a may, at step 308, determine the number of players that answered the follow-up question correctly for the present round and identify such players. At step 310, the first mobile computing device 108a may evenly allocate (e.g., distribute) the total possible points (e.g., points for the round plus any unallocated points from previous round(s)) to the players identified as answering the follow-up question correctly for the present round. For instance, if one player answered correctly, then that player receives all of the total possible points. If two or more players answered correctly, the total possible points are split between them. As an example, if two players answered correctly and there are 3 total possible points, then each of those two players receives 1.5 points. The process of FIG. 3 may be repeated for each round (e.g., each occurrence of performing step 240).

In one example, the present round is the first round and the total number of players is 3. In such an example, the points for the present round are 3 points and there are no unallocated points from a previous round. If none of the players answered the follow-up question correctly, then no player is allocated any points and the 3 points is set to be unallocated in the gaming table for allocation in subsequent rounds. In the second round, the total possible points are 6 points (e.g., 3 points from the present round plus 3 points unallocated from the previous round). If again none of the players answer the follow-up question for the present round correctly, then the 6 points is set to be unallocated in the gaming table for allocation in subsequent rounds. In the third round, the total possible points are 9 points (e.g., 3 points from the present round plus 6 points from unallocated from the previous rounds). If one player answers the follow-up question for the third round correctly, then that player receives all 9 points. If two players answer the follow-up question for the third round correctly, each of those players receives 4.5 points. If all three players answer the follow-up question for the third round correctly, each of the players receives 3 points. Notably, if at least one of the players answered the follow-up question correctly, all prior unallocated points are allocated. In the fourth round, the total possible points are 3 points (e.g., 3 points from the present round plus 0 points unallocated from the previous rounds).

Returning to FIG. 2F, at step 241, the first mobile computing device 108a may determine if the original question (e.g., question presented in steps 218-220; not follow-up question) for the present round is the final question. The determination is based on the game length and whether the follow-up question for the present round has been answered correctly by at least one player. As discussed above, the game length is selected in step 211 via a user interface such as the user interface depicted in FIG. 8. The game length represents the intended total number of original questions presented to the players 110 in steps 218-220. For instance, if a game length of 5 questions is selected in step 211, then the game is intended to have 5 rounds presenting a different original question as the process of FIGS. 2C-2F iterates such that 5 different original questions are presented to the players 110 in steps 218-220.

The first mobile computing device 108a may track the number of rounds (e.g., the number of different original questions presented to the players) using a round counter, which may be stored in the gaming table. If the round counter is less than the selected game length, then the original question for the present round is not the final question and, thus, the present round is not the final round. Otherwise, if the round counter is greater than or equal to the selected game length, then the first mobile computing device 108a may determine whether the follow-up question for the present round has been answered correctly by at least one player. If not, then the original question for the present round is not the final question and, thus, the present round is not the final round. Notably, it does not matter if follow-up questions answered in in one or more previous rounds were answered incorrectly. Because the follow-up question of the present round was not answered correctly by any player 110, there are unallocated points in the game. Thus, the game continues to have additional rounds (e.g., the steps of 218-244 are repeated) until at least one player answers the follow-up question for that additional round correctly, which enables allocation of all remaining unallocated points.

The first mobile computing device 108 may track points of the players 110 as the game progresses. For instance, points for each player may be stored in the gaming table. If the question for the present round is not the final question (e.g., not the final round), the first mobile computing device 108a may add any points for the players for the present round to their point totals and determine a ranking based on number of points. If the question for the present is the final question (e.g., the present round is the final round), the first mobile computing device 108a may add any points for the players for the present round to their point totals, determine a ranking based on number of points, and determine a winner (e.g., the player with the most points).

At step 242, the first mobile computing device 108a may transmit point allocations and a next question (if any). Specifically, the first mobile computing device 108a may transmit a message to the other mobile computing devices 108b-c. The message may include one or more of the following: point allocations for each player for the present round (e.g., 0 if no player answered correctly), number of players that answered the follow-up question for the present round correctly, total points for each player, corresponding player identifiers, an indication of the correct answer to the follow-up question for the present round, an indication that no player answered the follow-up question for the present round correctly if no player answered the follow-up question for the present round correctly, the number of unallocated points to be possibly allocated in the next round (if any), the current player rankings, the next original question to present in steps 218-220 of the next round if not final round, and/or the winner of the game if the final round. The first mobile computing device 108a may determine the next question from a question repository based on the selected rating and category. In some cases, the next question may not be a duplicate of any previously presented question in the game.

Figures 13, 14:
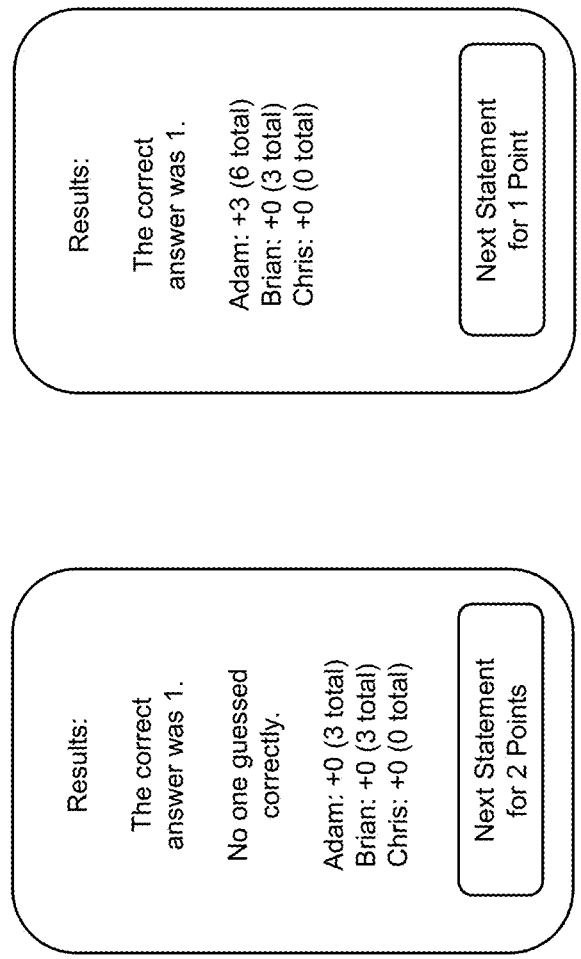

In steps 242-244, each of the mobile computing devices 108a-c may display, via a user interface, the information included in the message to the players 110a-c. If the round is not the final round, the user interface may include a button to go to next question or statement of the next round as shown in FIG. 13. If no one answered the follow-up question correctly, an example user interface is depicted in FIG. 13. If one player answered correctly but is not the final round, an example user interface is depicted in FIG. 14. If the present round is the final round, the winner is highlighted. At step 245, if there is a next round (e.g., next original) question, the mobile computing devices 108 may repeat steps 218-244 until the game is complete. Steps 218-244 may constitute one round in the game.

Returning to steps 218-223 and the example user interface depicted in FIG. 11, the first player 110a, as a result of being the host, may have the ability to skip or replace the original question for the present round. If the first player 110a selects to skip the question, the first mobile computing device 108a may determine a next original question, transmit the next original question to the other mobile computing devices 108b-c. The mobile computing devices 108a-c may repeat steps 218-223 and display the next original question is a similar user interface as depicted in FIG. 11. If an original question is skipped, the skipped original question does not count towards the game length (e.g., the counter for the game length is not incremented). If the first player 110a selects to replace the original question, the first player 110a is prompted to enter a custom next question, which is transmitted and displayed in a manner similar to the next question discussed above for a skipped question. The question that is replaced by the custom question does not count towards the game length (e.g., the counter for the game length is not incremented).

While in the examples above, the process was described for a game having 3 players, the game may have any number of players and corresponding mobile computing devices. Further, while the process of FIGS. 2 and 3 was described as having a particular order, the steps may be performed in any differing order, and one or more steps may be omitted. While in the above discussion, management of the game was described as being performed by the first mobile computing device 108a as a result of starting the game, in some cases, the processing server 104 may perform the management of the game (e.g., perform one or more determinations and transmission described as being performed by the first mobile computing device 108a). In such cases, each of the mobile computing devices 108 may receive information from the processing server 104 for display information. Further, each of the mobile computing devices 108 may transmit information to the processing server 104.

Figure 15:
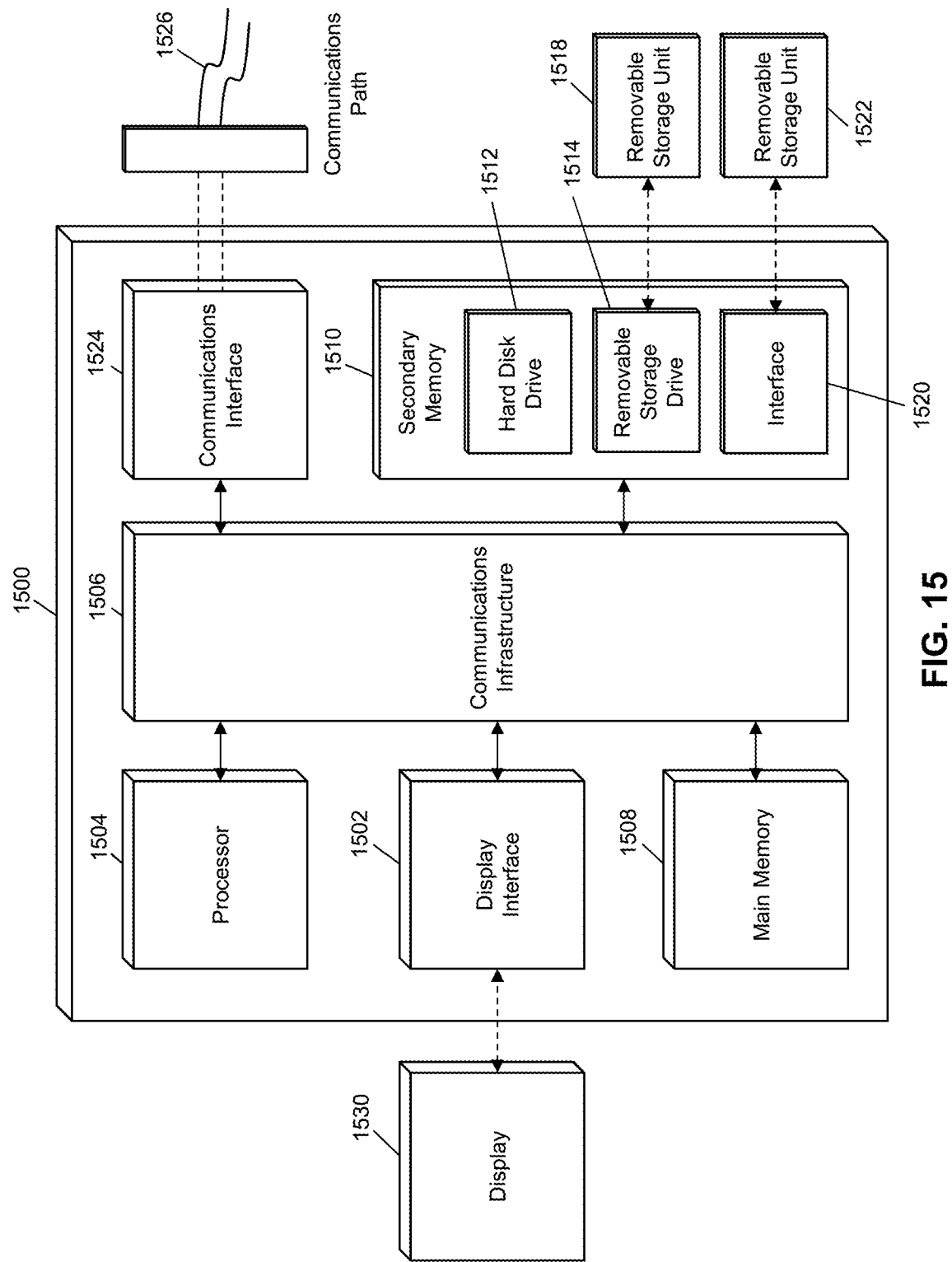
FIG. 15 is a block diagram depicting a computer system architecture in accordance with illustrative embodiments.

FIG. 15 illustrates a computer system 1500 in which embodiments of the present disclosure, or portions thereof, may be implemented as computer-readable code. For example, one or more (e.g., each) of the app store 102, processing server 104, and/or mobile computing devices 108 may be implemented in the computer system 1500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 2-3.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 1518, a removable storage unit 1522, and a hard disk installed in hard disk drive 1512.

Various embodiments of the present disclosure are described in terms of this example computer system 1500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1504 may be a special purpose or a general purpose processor device specifically configured to perform the functions discussed herein. The processor device 1504 may be connected to a communications infrastructure 1506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 1500 may also include a main memory 1508 (e.g., random access memory, read-only memory, etc.), and may also include a secondary memory 1510. The secondary memory 1510 may include the hard disk drive 1512 and a removable storage drive 1514, such as a floppy disk drive, a magnetic tape drive, an optical disk drive, a flash memory, etc.

The removable storage drive 1514 may read from and/or write to the removable storage unit 1518 in a well-known manner. The removable storage unit 1518 may include a removable storage media that may be read by and written to by the removable storage drive 1514. For example, if the removable storage drive 1514 is a floppy disk drive or universal serial bus port, the removable storage unit 1518 may be a floppy disk or portable flash drive, respectively. In one embodiment, the removable storage unit 1518 may be non-transitory computer readable recording media.

In some embodiments, the secondary memory 1510 may include alternative means for allowing computer programs or other instructions to be loaded into the computer system 1500, for example, the removable storage unit 1522 and an interface 1520. Examples of such means may include a program cartridge and cartridge interface (e.g., as found in video game systems), a removable memory chip (e.g., EEPROM, PROM, etc.) and associated socket, and other removable storage units 1522 and interfaces 1520 as will be apparent to persons having skill in the relevant art.

Data stored in the computer system 1500 (e.g., in the main memory 1508 and/or the secondary memory 1510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 1500 may also include a communications interface 1524. The communications interface 1524 may be configured to allow software and data to be transferred between the computer system 1500 and external devices. Exemplary communications interfaces 1524 may include a modem, a network interface (e.g., an Ethernet card), a communications port, a PCMCIA slot and card, etc. Software and data transferred via the communications interface 1524 may be in the form of signals, which may be electronic, electromagnetic, optical, or other signals as will be apparent to persons having skill in the relevant art. The signals may travel via a communications path 1526, which may be configured to carry the signals and may be implemented using wire, cable, fiber optics, a phone line, a cellular phone link, a radio frequency link, etc.

The computer system 1500 may further include a display interface 1502. The display interface 1502 may be configured to allow data to be transferred between the computer system 1500 and external display 1530. Exemplary display interfaces 1502 may include high-definition multimedia interface (HDMI), digital visual interface (DVI), video graphics array (VGA), etc. The display 1530 may be any suitable type of display for displaying data transmitted via the display interface 1502 of the computer system 1500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 1508 and secondary memory 1510, which may be memory semiconductors (e.g., DRAMs, etc.). These computer program products may be means for providing software to the computer system 1500. Computer programs (e.g., computer control logic) may be stored in the main memory 1508 and/or the secondary memory 1510. Computer programs may also be received via the communications interface 1524. Such computer programs, when executed, may enable computer system 1500 to implement the present methods as discussed herein. In particular, the computer programs, when executed, may enable processor device 1504 to implement the methods illustrated by FIGS. 2-3, as discussed herein. Accordingly, such computer programs may represent controllers of the computer system 1500. Where the present disclosure is implemented using software, the software may be stored in a computer program product and loaded into the computer system 1500 using the removable storage drive 1514, interface 1520, and hard disk drive 1512, or communications interface 1524.

The processor device 1504 may comprise one or more modules or engines configured to perform the functions of the computer system 1500. Each of the modules or engines may be implemented using hardware and, in some instances, may also utilize software, such as corresponding to program code and/or programs stored in the main memory 1508 or secondary memory 1510. In such instances, program code may be compiled by the processor device 1504 (e.g., by a compiling module or engine) prior to execution by the hardware of the computer system 1500. For example, the program code may be source code written in a programming language that is translated into a lower level language, such as assembly language or machine code, for execution by the processor device 1504 and/or any additional hardware components of the computer system 1500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 1500 to perform the functions disclosed herein. It will be apparent to persons having skill in the relevant art that such processes result in the computer system 1500 being a specially configured computer system 1500 uniquely programmed to perform the functions discussed above.

Techniques consistent with the present disclosure provide, among other features, systems and methods for leveraging the anonymous nature of the computing devices to facilitate truthful answers. While various illustrative embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method comprising:
   receiving, by a first mobile computing device, a user input to establish a game between a first user of the first mobile computing device and a plurality of other users respectively of a plurality of other mobile computing devices;
   based on the receiving, generating, by the first mobile computing, a quick response (QR) code comprising a machine-readable label including a network address of the first mobile computing device, wherein the QR code is unique to the game;
   displaying, by the first mobile computing device, the QR code;
   based on the QR code, establishing, by the first mobile computing device with the plurality of other mobile computing devices, the game between the first user of the first mobile computing device and the plurality of other users respectively of the plurality of other mobile computing devices;
   transmitting, by the first mobile computing device and to the plurality of other mobile computing devices, a first original question and preset answer options for display;
   receiving, by the first mobile computing device, an answer to the first original question from the first user;
   receiving, by the first mobile computing device and from the plurality of other mobile computing devices, a plurality of answers to the first original question from the plurality of other users;
   maintaining, by the first mobile computing device, anonymity of an association of the plurality of other users to the plurality of answers to the first original question from the plurality of other users;
   determining, by the first mobile computing device, a first follow-up question to the first original question, a correct answer to the first follow-up question, and one or more incorrect answers to the first follow-up question based on:
     the answer to the first original question from the first user, and
     the plurality of answers to the first original question from the plurality of other users;
   transmitting, by the first mobile computing device and to the plurality of other mobile computing devices for display, the first follow-up question to the first original question, the correct answer to the first follow-up question, and the one or more incorrect answers to the first follow-up question;
   displaying, by the first mobile computing device, the first follow-up question to the first original question, the correct answer to the first follow-up question, and the one or more incorrect answers to the first follow-up question;
   receiving, by the first mobile computing device, an answer to the first follow-up question from the first user;
   receiving, by the first mobile computing device and from the plurality of other mobile computing devices, a plurality of answers to the first follow-up question from the plurality of other users;
   determining, by the first mobile computing device, whether at least one user answered the first follow-up question correctly; and
   transmitting, by the first mobile computing device and to the plurality of other mobile computing devices, results of the determination of whether at least one user answered the first follow-up question correctly.

2. The method of claim 1, further comprising:
   determining, by the first mobile computing device, that neither the first user nor any of the plurality of the other users answered the first follow-up question correctly; and
   in response, determining, by the first mobile computing device, not to allocate any points to any of the first user or any of the plurality of the other users.

3. The method of claim 2, further comprising:
   determining, by the first mobile computing device, a number of points for answering the first follow-up question correctly; and
   storing, by the first mobile computing device, the number of points for answering the first follow-up question correctly for future allocation.

4. The method of claim 3, further comprising:
   in response to determining that at least one of the first user or one or more of the plurality of other users answered a second follow-up question for a second original question correctly, allocating, by the first mobile computing device, the stored number of points for answering the first follow-up question correctly and a number of points for answering the second follow-up question correctly.

5. The method of claim 4, wherein the allocated points is evenly split between each user that answered the second follow-up question correctly.

6. The method of claim 1, further comprising:
   determining whether a present original question is a final original question based on a game length selected by the first user and whether a present follow-up question to the present original question has been answered correctly by at least one of the first user or one of the plurality of other users.

7. The method of claim 1, wherein the first original question is in the form of a statement.

8. A first mobile computing device, comprising:
a processor; and
a memory storing instructions that, when executed by the processor, cause the first mobile computing device to:
receive a user input to establish a game between a first user of the first mobile computing device and a plurality of other users respectively of a plurality of other mobile computing devices;
based on the receiving, generate a quick response (QR) code comprising a machine-readable label including a network address of the first mobile computing device, wherein the QR code is unique to the game;
display the QR code;
based on the QR code, establish, with the plurality of other mobile computing devices, the game between the first user of the first mobile computing device and the plurality of other users respectively of the plurality of other mobile computing devices;
transmit, to the plurality of other mobile computing devices, a first original question and preset answer options for display;
receive an answer to the first original question from the first user;
receive, from the plurality of other mobile computing devices, a plurality of answers to the first original question from the plurality of other users;
maintain anonymity of an association of the plurality of other users to the plurality of answers to the first original question from the plurality of other users;
determine a first follow-up question to the first original question, a correct answer to the first follow-up question, and one or more incorrect answers to the first follow-up question based on:
the answer to the first original question from the first user, and
the plurality of answers to the first original question from the plurality of other users;
transmit, to the plurality of other mobile computing devices for display, the first follow-up question to the first original question, the correct answer to the first follow-up question, and the one or more incorrect answers to the first follow-up question;
display the first follow-up question to the first original question, the correct answer to the first follow-up question, and the one or more incorrect answers to the first follow-up question;
receive an answer to the first follow-up question from the first user;
receive, from the plurality of other mobile computing devices, a plurality of answers to the first follow-up question from the plurality of other users;
determine whether at least one user answered the first follow-up question correctly; and
transmit, to the plurality of other mobile computing devices, results of the determination of whether at least one user answered the first follow-up question correctly.

9. The first mobile computing device of claim 8, wherein the instructions, when executed by the processor, further cause the first mobile computing device to:
determine that neither the first user nor any of the plurality of the other users answered the first follow-up question correctly; and
in response, determine not to allocate any points to any of the first user or any of the plurality of the other users.

10. The first mobile computing device of claim 9, wherein the instructions, when executed by the processor, further cause the first mobile computing device to:
determine a number of points for answering the first follow-up question correctly; and
store the number of points for answering the first follow-up question correctly for future allocation.

11. The first mobile computing device of claim 10, wherein the instructions, when executed by the processor, further cause the first mobile computing device to:
in response to determining that at least one of the first user or one or more of the plurality of other users answered a second follow-up question for a second original question correctly, allocate the stored number of points for answering the first follow-up question correctly and a number of points for answering the second follow-up question correctly.

12. The first mobile computing device of claim 11, wherein the allocated points is evenly split between each user that answered the second follow-up question correctly.

13. The first mobile computing device of claim 8, wherein the instructions, when executed by the processor, further cause the first mobile computing device to:
determine whether a present original question is a final original question based on a game length selected by the first user and whether a present follow-up question to the present original question has been answered correctly by at least one of the first user or one of the plurality of other users.

14. The first mobile computing device of claim 8, wherein the first original question is in the form of a statement.

15. A system comprising:
a first mobile computing device; and
a plurality of other mobile computing devices,
wherein the first mobile computing device is configured to:
receive a user input to establish a game between a first user of the first mobile computing device and a plurality of other users respectively of the plurality of other mobile computing devices;
based on the receiving, generate a quick response (QR) code comprising a machine-readable label including a network address of the first mobile computing device, wherein the QR code is unique to the game;
display the QR code;
based on the QR code, establish, with the plurality of other mobile computing devices, the game between the first user of the first mobile computing device and the plurality of other users respectively of the plurality of other mobile computing devices;
transmit, to the plurality of other mobile computing devices, a first original question and preset answer options for display;
receive an answer to the first original question from the first user;
receive, from the plurality of other mobile computing devices, a plurality of answers to the first original question from the plurality of other users;
maintain anonymity of an association of the plurality of other users to the plurality of answers to the first original question from the plurality of other users;
determine a first follow-up question to the first original question, a correct answer to the first follow-up question, and one or more incorrect answers to the first follow-up question based on:
the answer to the first original question from the first user, and the plurality of answers to the first original question from the plurality of other users;

transmit, to the plurality of other mobile computing devices for display, the first follow-up question to the first original question, the correct answer to the first follow-up question, and the one or more incorrect answers to the first follow-up question;

display the first follow-up question to the first original question, the correct answer to the first follow-up question, and the one or more incorrect answers to the first follow-up question;

receive an answer to the first follow-up question from the first user;

receive, from the plurality of other mobile computing devices, a plurality of answers to the first follow-up question from the plurality of other users;

determine whether at least one user answered the first follow-up question correctly; and transmit, to the plurality of other mobile computing devices, results of the determination of whether at least one user answered the first follow-up question correctly.

16. The system of claim 15, wherein the first mobile computing device is configured to:

determine that neither the first user nor any of the plurality of the other users answered the first follow-up question correctly; and in response, determine not to allocate any points to any of the first user or any of the plurality of the other users.

17. The system of claim 16, wherein the first mobile computing device is configured to:

determine a number of points for answering the first follow-up question correctly; and store the number of points for answering the first follow-up question correctly for future allocation.

18. The system of claim 17, wherein the first mobile computing device is configured to:

in response to determining that at least one of the first user or one or more of the plurality of other users answered a second follow-up question for a second original question correctly, allocate the stored number of points for answering the first follow-up question correctly and a number of points for answering the second follow-up question correctly.

19. The system of claim 18, wherein the allocated points is evenly split between each user that answered the second follow-up question correctly.

20. The system of claim 15, wherein the first mobile computing device is configured to:

determine whether a present original question is a final original question based on a game length selected by the first user and whether a present follow-up question to the present original question has been answered correctly by at least one of the first user or one of the plurality of other users.

21. The system of claim 15, wherein the first original question is in the form of a statement.

* * * * *